US012587868B2

(12) United States Patent
Medarametla Lakshmi

(10) Patent No.: US 12,587,868 B2
(45) Date of Patent: Mar. 24, 2026

(54) SYSTEMS AND METHODS FOR PROXYING REAL TRAFFIC FOR SIMULATION

(71) Applicant: T-MOBILE USA, INC., Bellevue, WA (US)

(72) Inventor: Bharath Reddy Medarametla Lakshmi, Issaquah, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 691 days.

(21) Appl. No.: 17/508,389

(22) Filed: Oct. 22, 2021

(65) Prior Publication Data

US 2023/0126496 A1      Apr. 27, 2023

(51) Int. Cl.
| | |
|---|---|
| *H04W 16/22* | (2009.01) |
| *H04W 24/02* | (2009.01) |
| *H04W 76/20* | (2018.01) |
| *H04W 88/08* | (2009.01) |
| *H04W 88/18* | (2009.01) |

(52) U.S. Cl.
CPC ........... *H04W 16/22* (2013.01); *H04W 24/02* (2013.01); *H04W 76/20* (2018.02); *H04W 88/08* (2013.01); *H04W 88/182* (2013.01)

(58) Field of Classification Search
CPC ..... H04W 16/22; H04W 24/02; H04W 24/04; H04W 24/06; H04W 24/08; H04W 76/20; H04W 88/08; H04W 88/182
See application file for complete search history.

(56) References Cited

U.S. PATENT DOCUMENTS

| | | | | |
|---|---|---|---|---|
| 7,120,432 | B2 * | 10/2006 | Voyer .................... | H04W 16/22 |
| | | | | 455/67.11 |
| 9,768,893 | B1 * | 9/2017 | Wank ................. | H04B 17/0085 |
| 10,033,473 | B1 * | 7/2018 | Kyrolainen ........ | H04B 17/3911 |
| 10,356,597 | B2 * | 7/2019 | Prasad ................. | H04W 24/02 |
| 10,505,646 | B2 * | 12/2019 | Kyosti ................. | H04B 7/0617 |
| 10,681,570 | B2 * | 6/2020 | Doshi ................. | H04L 41/0886 |
| 10,742,887 | B1 * | 8/2020 | Gigot ................. | H04N 23/6812 |
| 2008/0080536 | A1 * | 4/2008 | Chhaya ................. | H04L 41/145 |
| | | | | 370/401 |
| 2012/0327782 | A1 * | 12/2012 | Tanaka .................... | H04L 41/12 |
| | | | | 370/241 |
| 2013/0217382 | A1 * | 8/2013 | Kudo .................... | H04W 24/04 |
| | | | | 455/423 |
| 2016/0050573 | A1 * | 2/2016 | Merkel ................. | H04W 24/06 |
| | | | | 455/67.11 |
| 2017/0324617 | A1 * | 11/2017 | Prasad .................. | H04W 24/02 |
| 2017/0339584 | A1 * | 11/2017 | Ketonen .............. | H04W 24/08 |
| 2018/0049050 | A1 * | 2/2018 | Doshi .................. | H04W 24/06 |
| 2018/0049051 | A1 * | 2/2018 | Doshi .................. | H04L 41/145 |

(Continued)

*Primary Examiner* — Matthew C Sams
(74) *Attorney, Agent, or Firm* — Lee & Hayes, P.C.

(57) ABSTRACT

Methods, systems, and non-transitory computer readable media for validating a simulated component of a communication network using real traffic. More particularly, a simulator instantiates a simulation environment that includes a base station module, a user equipment (UE) module, and a simulated communication link therebetween. Real traffic generated by a non-simulated UE is sent to a proxy that routes the traffic to the UE module. As a result, test software instated in the simulation environment can be validated using traffic generated by a non-simulated UE.

20 Claims, 4 Drawing Sheets

300

```
                    ┌─────────────────────────────────────┐
                    │            Simulator          ┌110    120              130
                    │                               │
  ┌──────┐ ┌105     │ ┌──────────┐ ┌112 ┌──────────┐┌118   ┌──────────┐  ┌ ─ ─ ─ ─ ─ ┐
  │  UE  │          │ │UE Module │     │ BS Module │       │ Backhaul │  │Configuration│
  └──────┘          │ └──────────┘     └───────────┘       └──────────┘  │   Device   │
                    └───────────────────────────────┘                    └ ─ ─ ─ ─ ─ ┘

Reverse Traffic
  ─────────────────►
            302        Reverse Traffic
                      ─────────────────►
                               304         Reverse Traffic
                                          ─────────────────►
                                                   306
                                                      Forward Traffic
                                          ◄─────────────────
                      Forward Traffic              308
                      ◄─────────────────
   Forward Traffic             310
  ◄─────────────────
            312
                                          Statistics / Alerts
                                          ┈┈┈┈┈┈┈┈┈┈┈┈┈┈┈┈┈►
                                                   314
                      Statistics / Alerts
                      ┈┈┈┈┈┈┈┈┈┈┈┈┈┈┈┈┈┈┈┈┈┈┈┈┈┈┈┈┈┈┈┈┈►
                               316
```

(56) References Cited

U.S. PATENT DOCUMENTS

| | | | |
|---|---|---|---|
| 2019/0349793 A1* | 11/2019 | Chockalingam | H04W 64/006 |
| 2021/0037485 A1* | 2/2021 | Khettry | H04L 5/0044 |
| 2022/0141698 A1* | 5/2022 | Zhang | H04W 28/0205 |
| | | | 370/329 |
| 2022/0158926 A1* | 5/2022 | Wennerstrom | H04L 41/0853 |
| 2022/0353709 A1* | 11/2022 | Takla | H04W 88/06 |
| 2023/0032596 A1* | 2/2023 | Mengwasser | H04L 43/55 |

* cited by examiner

400

INSTANTIATE A SIMULATION ENVIRONMENT — 402

RECEIVE REVERSE LINK TRAFFIC VIA PROXY — 404

ROUTE REVERSE LINK TRAFFIC OVER SIMULATED COMMUNICATION LINK — 406

PROCESS REVERSE LINK TRAFFIC — 408

RECEIVE FORWARD LINK TRAFFIC — 410

PROCESS FORWARD LINK TRAFFIC — 412

TRANSMIT FORWARD LINK TRAFFIC TO UE — 414

SYSTEMS AND METHODS FOR PROXYING REAL TRAFFIC FOR SIMULATION

FIELD OF THE DISCLOSURE

This application generally relates to improved simulation of user equipment (UE), and in particular, simulating UE behavior based on actual UE usage.

BACKGROUND

Network operators provide network services to user equipment (UEs) located within their network footprint (i.e., their "home network"). As part of maintaining these services, network operators often simulate network traffic to ensure service quality. For example, the network operator may simulate data to determine how and where to deploy network equipment, offer service plans, and/or troubleshoot issues experienced by network users. As another example, if a network operator intends to support new types of internet of things (IOT) devices (e.g., smart home equipment, vehicle OBD monitors, vehicle hotspots, etc.), network operators need to ensure that the IOT device exhibits sufficient network performance without impacting the network performance of other devices.

Conventional simulation tools often provide simulation scripts that generate pre-determined types of traffic flow. For example, the simulation tools can be configured to perform upload/download tests from pre-configured FTP sites. However, these scripts often do not reflect the actual usage of UEs. Thus, if a network operator approves a service change based upon the conventional simulation scripts, real-world devices may encounter issues not experienced during testing via the simulator. Accordingly, there is a need for systems and methods for proxying real traffic for simulation.

SUMMARY

In an embodiment, a network simulator is provided. The network simulator includes a base station module configured to (i) simulate performance of a base station of a communication network, (ii) receive forward link traffic from deployed components of the communication network, and (iii) transmit reverse link traffic to the deployed components of the communication network. The network simulator also includes a user equipment (UE) module configured to exchange data with the base station simulation module via a simulated communication link, the UE module being associated with a proxy configured to correspond a network address of a non-simulated UE with a network address associated with the UE module. The UE module may be configured to receive reverse link traffic from the non-simulated UE via the proxy and route the received reverse link traffic over the simulated communication link. Additionally, the UE module may be configured to receive forward link traffic from the base station simulation module and route the received forward link traffic to the non-simulated UE.

In another embodiment, a method for validating a simulated component of a communication network using real traffic is provided. The method includes (1) instantiating, by one or more processors, a simulation environment that includes (i) a base station module configured to simulate performance of a base station of a communication network, (ii) a user equipment (UE) module configured to simulate performance of a non-simulated UE, and (iii) a simulated communication link between the base station module and the UE module; (2) receiving, via a proxy, reverse link traffic from the non-simulated UE, the proxy configured to correspond a network address of the non-simulated UE and a network address associated with the UE module; (3) routing, by the one or more processors, the reverse link traffic over the simulated communication link; (4) processing, by the one or more processors and via the base station module, the reverse link traffic, wherein processing the reverse link traffic includes transmitting the reverse link traffic to deployed components of the communication network; (5) receiving, from the deployed components of the communication network, forward link traffic; (6) processing, by the one or more processors and via the base station module, the forward link traffic, wherein processing the forward link traffic includes transmitting the forward link traffic over the simulated communication link; and (7) transmitting, via the UE module, the forward link traffic to the non-simulated UE.

DETAILED DESCRIPTION

Figure 1:
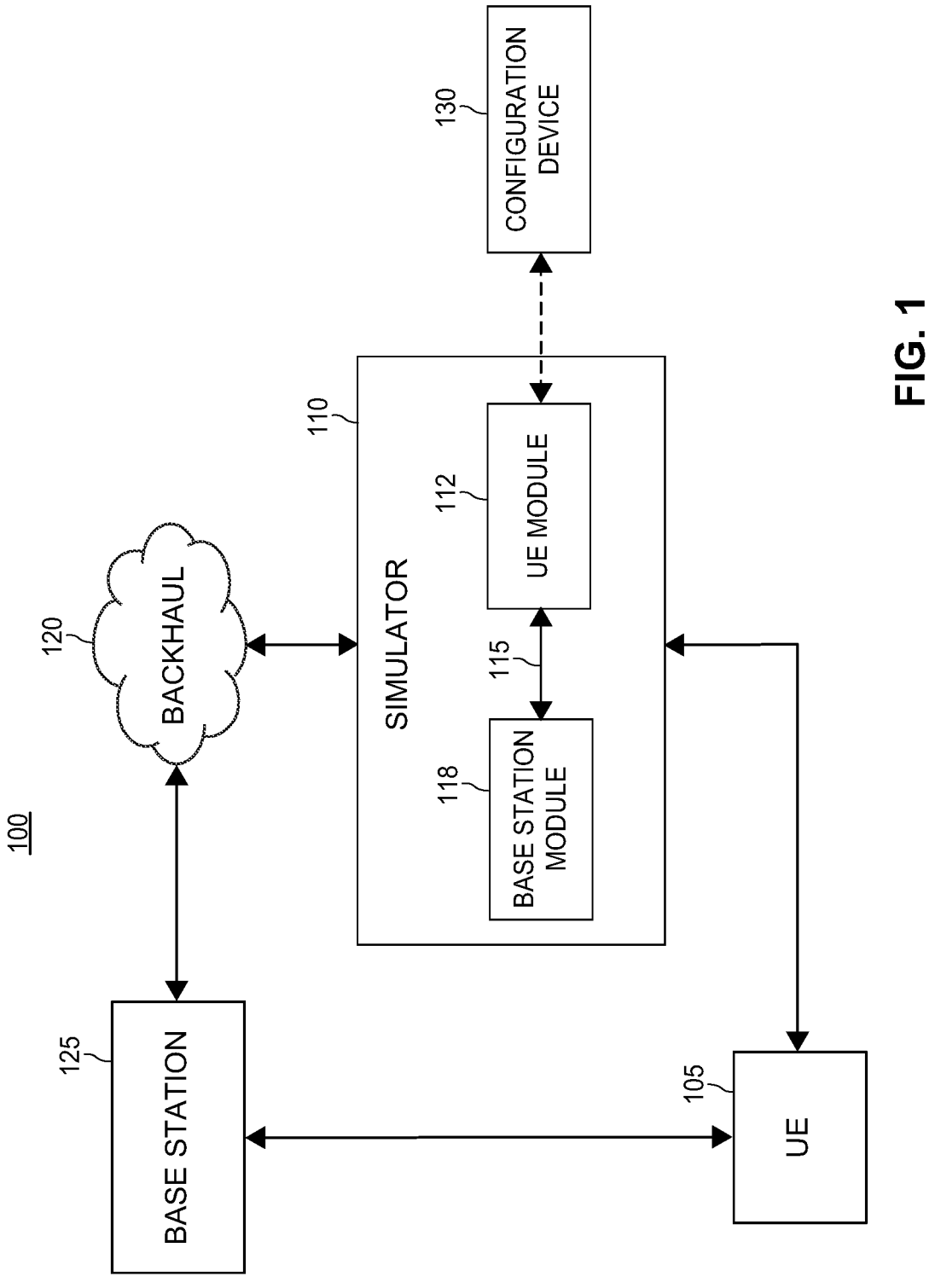
FIG. 1 depicts an example environment in which the proxying of traffic from user equipment (UE) techniques described herein are implemented.

FIG. 1 depicts an example environment 100 in which the proxying of traffic from user equipment (UE) techniques described herein are implemented. As illustrated, the environment 100 includes a simulator 110 at which the simulation techniques described herein are performed. As it is generally used herein, the term "simulator" includes computing devices that simulate the software components of a system under test, computing devices that emulate the hardware of the system under test in addition to simulating the software, and computing devices that include the actual hardware of the system under test on which the software components are executed. Accordingly, in some embodiments, the simulator 110 is a dedicated computing device sold by manufacturers of communication network equipment that include configurable hardware and/or software modules. For example, the simulator 110 may be computing system of a lab testing environment in which the simulator 110 is connected to antenna elements for communication with test UEs located inside the lab. As another example, the simulator 110 may be located at a base station and connected to deployed computing elements of the communication network. In these embodiments, the simulator 110 utilizes the hardware modules representative of a simulated component to execute the corresponding software modules.

In these embodiments, the simulator 110 may only have a rudimentary user interface. Accordingly, the simulator 110 may be connected to a configuration device 130 via which the simulator 110 is configured and/or status information regarding the simulated components are monitored. The configuration device 130 may be any type of electronic device such as a desktop computer, a notebook computer, a mobile device (e.g., a smartphone), a tablet, a computing device configured for wired and/or wireless communication, and/or the like. The connection may be a wired connection (e.g., a USB or Ethernet connection) or a wireless connection (e.g., Wi-F, Bluetooth, a communication protocol supported by the communication network, and/or other suitable wireless connection types).

In other embodiments, the simulator 110 is an end-user computing device storing a simulation application. For example, the simulator 110 may be desktop or laptop computer that executes the simulation application to set up a virtual simulation environment that relies on the computing components of the end-user device to execute the software modules of the simulated components. Accordingly, in these embodiments, the simulator 110 is not connected to the external configuration device 130. It should be appreciated that unless explicitly described otherwise, any description of the action performed by the configuration device 130 envisions the alternate performance by an end-user computing device that functions as the simulator 110.

As illustrated, the simulator 110 may include a base station module 118 and a UE module 112. When setting up the simulation environment, the simulator 110 may instantiate a copy of the base station module 118 and the UE module 112. That is, the simulator 110 may instantiate a software module corresponding to a base station and a software module corresponding to a UE that are executed by the respective hardware module and/or the processors of the simulator 110. The simulated base station module 118 and the UE module 112 may establish a simulated communication link 115 that complies with a pre-defined communication protocol (e.g., GSM, CDMA, VoIP, TDMA, WCDMA, LTE, EDGE, OFDM, GPRS, EV-DO, WiMAX, New Radio, and so on). It should be appreciated that while the protocol corresponding to the simulated communication link 115 may generally be associated with wireless communications, the messages exchanged between base station module 118 and the UE module 112 typically occur via a logic interface established by the simulator 110 when instantiating the simulation environment, not a physical wireless communication interface.

In conventional simulators, the simulator will execute a script to cause an instantiated UE module to generate traffic having pre-defined characteristics (e.g., by streaming video hosted on an external website, downloading a set of files from an FTP site) over a simulated communication link. However, these predefined scripts do not reflect typical usage of UEs that are operated by end-users. Accordingly, while a simulated UE or base station software module may pass performance and/or compliance testing in the conventional simulation environments, the same software modules may fail the same tests and/or benchmarks when deployed in a live communication network.

To generate more realistic traffic patterns, the simulator 110 is communicatively coupled to a real UE 105. The UE 105 may be any type of user equipment, including a mobile device (e.g., a smartphone), a tablet, a smart wearable, an IOT device, and/or the like. It should be appreciated that in some embodiments, the particular type of UE 105 is different than the type of UE modeled by the UE module 112. For example, if the communication network operator is testing an update to the deployed base station software via the simulator 110 (e.g., by validating that the base station software is able to properly route and track data in accordance with a new service plan), the UE module 112 may be a model of a generic UE that does not have a real-world equivalent.

The UE 105 and the simulator 110 may be coupled via a wired or wireless interface (e.g., via Wi-Fi, Bluetooth, USB, a wired connection to an RF port of the UE, and so on). That said, the communication link between the UE 105 and simulator 110 may utilize a different protocol than the simulated communication link 115. For example, the UE 105 may be coupled to the simulator 110 via a Wi-Fi communication link, whereas the simulated communication link 115 is an LTE or New Radio communication link. In these scenarios, the simulator 110 may encapsulate the data packets received via the external communication link with the UE 105 into the protocol supported by the simulated communication link 115. It should be appreciated that the data packets received from the UE 105 may be utilized for only the user plane connection for the UE module 112 in the simulation. To this end, because control plane communications are generally set out in the relevant protocol, the control plane messaging may be pre-programmed into the UE module 112.

As illustrated, the base station module 118 is also communicatively coupled to the backhaul 120 of the communication network. The backhaul 120 may include gateways (e.g., a packet data gateway (PGW), a serving gate way (SGW), etc.), authentication and/or authorization entities (e.g., a mobility management entity (MME), a home subscriber server (HSS)), and/or other backhaul components of communication networks and/or an evolved packet core (EPC). It should be appreciated that the backhaul 120 includes deployed components of the live communication network. Accordingly, the communication link between the simulator 110 and the backhaul 120 typically is based upon the same standard that defines the protocol used in the simulated communication link 115. That said, the particular protocol and/or interface type between the simulator 110 and the backhaul 120 may vary depending upon the particular data being communicated. For example, the base station module 118 may establish an S1-MME interface for communicating with an MME component of the backhaul 120, a N11 interface for control plane data communicating with a session management function (SMF) of the backhaul 120, and an S1-U interface for communicating user plane data with the SGW of the backhaul 120. As a result, despite having a simulated UE 112, the simulator 110 is able to send and receive data to external networks to simulate processing of real-world responses to the traffic generated at the UE 105.

It should be appreciated that the UE 105 is generally configured to communicate over the communication network via the deployed equivalent of the network component simulated by the simulator 110. In the illustrated embodiment, this means that the UE 105 would typically communicate over the backhaul 120 via the deployed base station 125. There are several different ways to reroute the traffic generated by the UE 105 to the simulator 110 (e.g., to cause the simulator 110 to be a proxy for the base station 125). In some embodiments, the simulator 110 is hosted at a dedicated location in the communication network. Accordingly, an application executing on the UE 105 may be configured to encapsulate all outgoing traffic into a data packet directed at the dedicated network location. As another example, the UE 105 may be placed into a lab environment in which the simulator 110 is coupled to wireless communication transceivers. Thus, while the UE 105 is in the lab environment, the UE 105 connects to the simulator 110 via the wireless communication transceivers for directly exchanging traffic therebetween. Other techniques known in the art to route traffic from the UE 105 to the simulator 110 instead of the base station 125 are also envisioned.

It should be appreciated that while FIG. 1 depicts an environment for simulating the base station 125, in other embodiments, a component of the communication network not in direct communication with the UE 105 (e.g., an MME, an HSS, an S-Gateway) may be simulated by the simulator 110. Accordingly, in these alternate embodiments, the UE 105 may still route the data packets to the deployed base station 125. In these embodiments, the base station 125 may be configured to establish the communication links with the simulator 110 that correspond to the component under test. For example, if a SMF module is simulated by the simulator 110, the base station 125 may forward the N11 interface communications to the simulator 110 instead of the SMF included in the backhaul 120. In these embodiments, the configuration device 130 may be communicatively coupled with the base station 125 in order configure the base station 125 to route session management packets received from a particular device (and/or network address) to the simulator 110 instead of the SMF in the backhaul 120.

Additionally, the simulator 110 may be configured to simulate multiple components of the communication network. Accordingly, the simulator 115 may establish additional simulated communication links between the simulated components. For example, if the simulator 110 is configured to simulate the base station module 118 and a SMF module (not shown), the simulator 110 may establish a simulated N11 communication link between the base station module 118 and the simulated SMF module.

Figure 2:
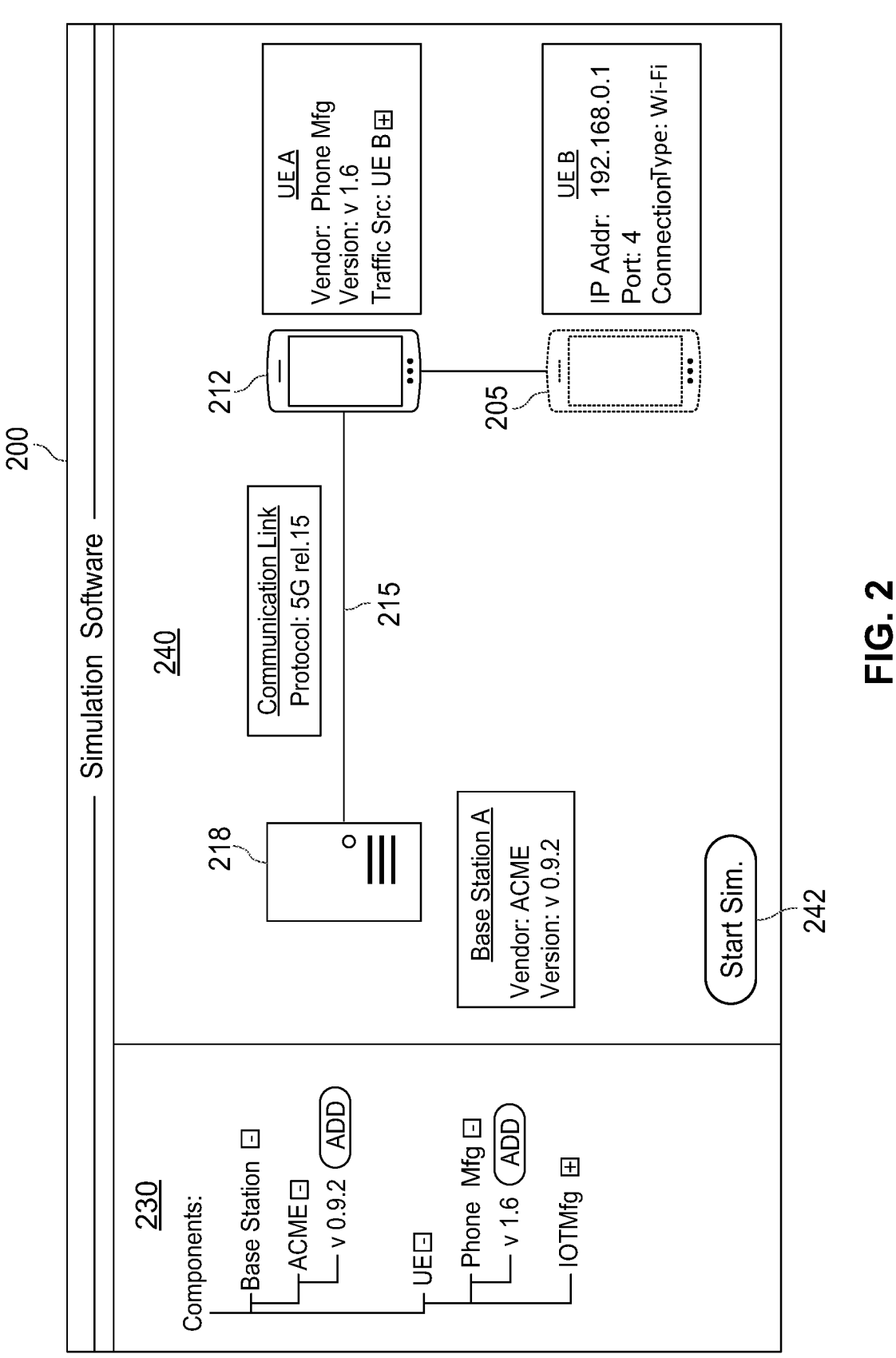
FIG. 2 depicts an example user interface to configure a simulation environment instantiated by a simulator, in accordance with techniques described herein.

FIG. 2 depicts an example user interface 200 for configuring the simulator 110 to instantiate a simulation environment, for example, a simulation environment that includes the UE module 112, the simulated communication link 115, and the base station module 118 of FIG. 1. Depending on the particular implementation, the user interface 200 may be presented by an application executing on the simulator 110 or the configuration device 130. It should be appreciated that FIG. 2 depicts only one example implementation of the user interface 200 and other implementations may include alternate user interface components that accomplish aspects of the described functionality.

As illustrated, the user interface 200 includes a component selection portion 230 and a simulation configuration portion 240. The component selection portion 230 includes a drop-down menu via which a user is able to select the particular components to simulate. For example, the drop down menu may enable the user to select from component types ("base station," "UE"), a particular model of the component type ("ACME," "Phone Mfg," "IOT Mfg") and a software version of the model ("v 0.9.2," "v 1.6"). For some components, the software modules for the listed components are bundled with the simulation software and/or the simulator 100. For other components, the user imports the software modules onto the simulator 110 to enable their selection via the user interface 200. For example, as part of developing software updates to deployed components (e.g., to support changes to the existing network or new features of the network), the developer may import the test software into the simulator 110 for simulation before deployment in the live communication network. It should be appreciated that in addition to the base stations, the simulation application may be configured to simulate other components of the communication network (e.g., an MME, an HSS, an S-Gateway, etc.) and/or functions of a virtual core network (e.g., a session management function (SMF), an access and mobility management function (AMF), a user plane function (UPF), etc.).

The simulation configuration portion 240 enables the user to configure the parameters associated with the software modules and the connections therebetween that will be instantiated by the simulation. For example, after interacting with a button to add a particular component to the simulation environment (e.g., the "add" button), the application may create an icon representative of the selected software module. In the illustrated example, the base station module 118 is represented by the icon 218, the UE module 112 is represented by the icon 212, and the simulated communication link 115 is represented by the line 215. The user interface 200 enables a user to configure the simulated communication link 115 to be compliant with a particular protocol. While FIG. 2 indicates that the illustrated simulated communication link uses Release 15 of the 5G standards, the simulator 110 may enable the user to simulate any type of communication link supported by both the UE module 112 and the base station module 118. Accordingly, the software modules used by the simulator 110 may include a set of indications associated with supported communication protocols. As such, after the user adds components from the component selection portion 230, the user interface 200 may present a protocol selection interface (not depicted) to select the communication protocol support by the simulated communication link 115.

The user interface 200 enables the user to configure the UE module 112 to transmit traffic generated by the real UE 105. Accordingly, the simulation configuration portion 240 includes an icon 205 representative of the UE 105. As illustrated, the user interface 200 enables the user to configure the simulation environment to route traffic received from the UE 105 for transmission over the simulated communication link 115. In some embodiments, the application automatically detects a communicative coupling between the UE 105 and the simulator 110 and configures the simulation environment with the network location for the UE 105 (e.g., the IP address and/or port number). In other embodiments, the user interacts with the user interface 200 to manually configure the application with the information indicative of the communicative coupling between the UE 105 and the simulator 110. As such, the simulator 110 is able to (i) route data received from the UE 105 via the communicative coupling to the UE module 112 for transmission over the simulated communication 115 and (ii) route data received at the UE module 112 over the simulated communication link 115 to the UE 105 via the communicative coupling.

As described with respect to FIG. 1, the simulator 110 is also communicatively coupled with the backhaul 120. In particular, the simulator 110 may be programmed with the network location for the components of the backhaul with which the base module 118 needs to interact with as part of the simulation. In some embodiments, the simulator 110 obtains the locations of the components of the backhaul from a live base station co-located with the simulator 110. Accordingly, because the simulator 110 is typically performed by someone associated with the communication network, the base station module 118 may be pre-configured with network locations of the relevant components of the backhaul 120 such that the simulator 110 is able to access network location information during the simulation. As such, the simulator 110 is able to (i) route data received by the base station module 118 via the communicative coupling to the relevant component of the backhaul 120 and (ii) route data received at the simulator 110 from the backhaul 120 over the simulated communication link 115 to the UE 105.

The user interface 200 also includes a user interface button 242 that enables the user to instantiate a simulation in accordance with the configuration defined in the simulation configuration portion 240. That is, when the user interacts with the button 242, the simulator 110 loads the software modules corresponding to the configuration portion onto the respective hardware modules. For example, if the simulator 110 is an emulator for a particular component, the simulator 110 loads the software module for the component onto the emulated hardware module. After the simulator 110 instantiates the modules of the simulation, the modules may interface with one another according to the selected communication protocol to establish the simulated communication link 115. That is, the UE module 112 may generate the control plane messaging to initiate and complete the network registration process defined by the selected communication protocol prior to the simulator 110 routing traffic received from the UE 105 to the UE module 112.

Assuming that there are no errors in establishing the simulated communication link, the simulator 110 then routes the traffic generated by the UE 105 over the user-plane of the simulated communication link 115 in accordance with the instantiated simulation. For example, the simulator 110 may enable a proxy that routes traffic received from the UE 105 to the UE module 112. In some embodiments, the simulator 110 implements known network address translation (NAT) techniques to set up the proxy. In some embodiments, the proxy may be established at a computing entity between the simulator 110 and the UE 105. For example, the proxy may be established at the base station 125 to route traffic from the UE 105 to the simulator 110.

After the proxy is established, a test engineer may execute one or more test cases to validate the software used in the UE module 112, the base station module 118, and/or any other software module simulated by the simulator 110. It should be appreciated that unlike test cases executed in a lab environment, the UE 105 typically includes a plurality of applications running in the background that send/receive data from respective content servers. Accordingly, even when a user of the UE 105 executes a test case to, say, stream a video from a particular website, the UE 105 is also engaged in a plurality of communication sessions associated with the background applications. As a result, the test cases executed via proxying the traffic from the UE 105 via the UE module 112 are more likely to detect any errors related to the collision between data streams (which is more likely to occur in real-world scenarios) and/or the simultaneous processing multiple types of data streams.

It should be appreciated that for some test cases, the network operator may still want to isolate individual data streams and/or specifically time requests associated with multiple data streams such that they collide with one another. Accordingly, in some embodiments, the simulator 110 may be configured to include an indication of one or more data streams supported by the simulated communication link 115. The user interface associated with the simulation application may enable the user to select a particular data stream and associate the data stream with a scheduling condition associated with the test case. As another example, the simulation application may be configured to monitor the reverse link traffic to identify particular types of packets (e.g., requests to establish a data stream, a request to access a feature, etc.). Accordingly, the UE module 112 may be configured to hold packets matching a particular type until a scheduling condition is met and/or a user input is received.

As a result, in some embodiments, the UE module 112 is additionally programmed to mimic conventional test cases that are performed using pre-configured simulation scripts in addition to test cases that rely on real world traffic patterns for validation.

Figure 3:
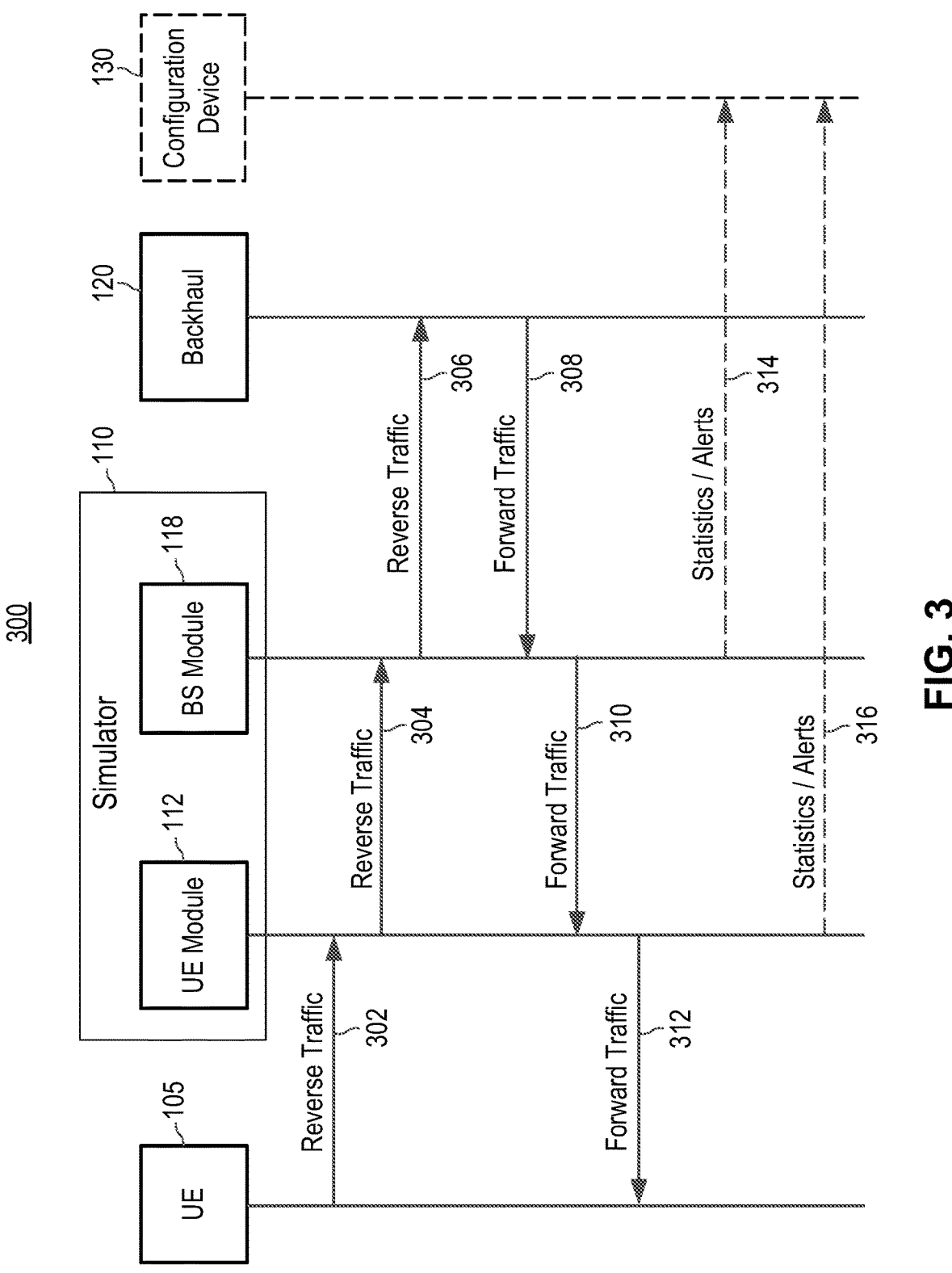
FIG. 3 depicts an example signal diagram for the communication flow of proxying traffic generated by a UE into a simulation environment, in accordance with techniques described herein.

FIG. 3 depicts a signal diagram 300 illustrating the communication flow for proxying traffic generated by the UE 105 into a simulation environment via the UE module 112. Prior to the start of the signal diagram, a simulator, such as the simulator 110, instantiates a simulation environment that includes the UE module 112 and the base station module 118. As described with respect to FIG. 1, the simulator 110 is also coupled with the backhaul 120 and, in some embodiments, a configuration device 130. For example, a user may interact with the user interface 200 of FIG. 2 to configure and instantiate the simulation.

The signal diagram 300 begins when the UE 105 transmits (line 302) reverse link traffic over the communication link between the UE 105 and the simulator 110. The simulator 110 detects that the reverse traffic is received from the UE 105. For example, the simulator 110 may detect an identifier associated with the UE 105 (e.g., a MEID, a UICCID, a MAC address, an IP address, etc.) included in the traffic. As another example, the simulator 110 may detect the traffic at a port assigned to the UE 105. In response, the simulator 110 encapsulates the traffic in data packets configured in accordance with the simulated communication link 115 and routes the data packets to the UE module 112.

In response, the UE module 112 transmits (line 304) the reverse link traffic over the user-plane of the simulated communication link. The base station module 118 may then process the reverse link traffic using the software under test. As part of the processing, the base station module 118 may then transmit (line 306) the reverse link traffic via a physical communication link to a component of the backhaul 120 defined by the communication standard. For user plane data, the component may be a UPF or S-Gateway of the backhaul 120. In some alternate embodiments where the UPF or S-Gateway is included in the simulation at the simulator 110, the base station module 118 may route the user-plane data of a simulated communication link to the UPF or S-Gateway module, which then routes the data to the corresponding component of the backhaul 120 (e.g., a P-Gateway). In some embodiments, the destinations in the backhaul 120 may be configured into the base station module 118 via the configuration module 130 and/or the simulation software executing on the simulator 110. The backhaul 120 then routes the traffic to the destination indicated in the reverse link traffic (e.g., an IP address corresponding to a web server).

In response, the destination will typically reply to the reverse link traffic. For example, the response may be an acknowledgement or the transmission of a requested type of content. This response is sent back over the backhaul 120 as forward link traffic, which then transmits (line 308) the forward link traffic to the simulator 110. In some embodiments, the backhaul 120 may be configured to transmit the forward link traffic to a particular port associated with the base station module 118.

In response, the base station module 118 processes the forward link traffic using the software under test. As part of the processing, the base station module 118 may transmit (line 310) the forward link traffic over the simulated communication link to the UE module 112. The UE module 112 then transmits (line 312) the forward link traffic to the UE 105. It should be appreciated that the steps 302-312 may be repeated any number of times as part of testing a software module via the simulator 110.

In addition to acting as a proxy for forward and reverse link traffic, the simulator 110 (and/or the modules thereof) may monitor the traffic flow to compile data, such as statistics, alerts, performance metrics, pass/fail metrics, etc., associated with the traffic flow. To this end, each simulated module may monitor the traffic flow to detect any errors (e.g., by detecting an error code) associated with processing the forward and reverse link traffic. As another example, the modules may measure a throughput, data rate, and/or other metric of processing performance to compare to a bench-mark rate. If the metric is below the benchmark rate, the module may generate an alert.

As illustrated, the base station module 118 and the UE module 112 may be configured to transmit (lines 314, 316) the performance statistics and/or alerts to the configuration device 130 to monitor testing of the corresponding software modules. As one example, the modules may be configured to stream instantaneous performance metrics (e.g., throughput, packet loss, round trip time) to the configuration device 130. As another example, the modules may be configured to send an alert when an error is detected and/or when performance drops below the benchmark rates. In some embodiments, the statistics and alerts are additionally or alternatively displayed on a user interface of the simulator 110.

Figure 4:
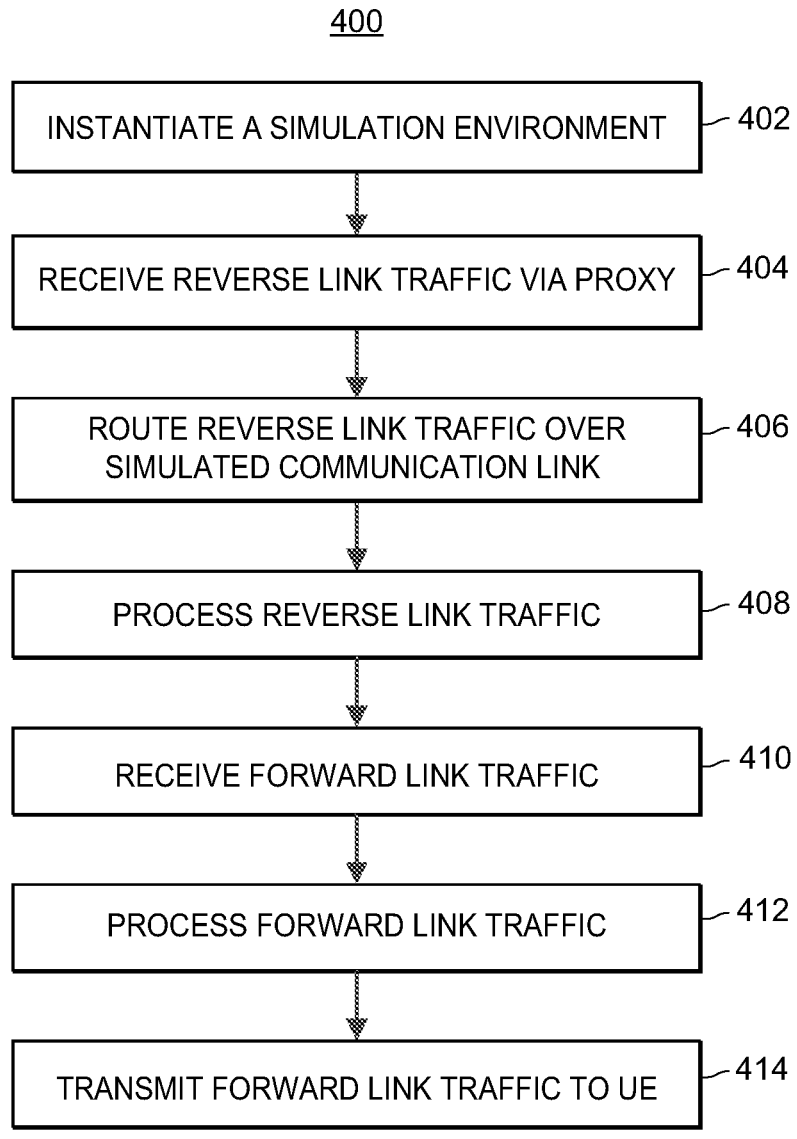
FIG. 4 depicts an example method for validating a simulated component of a communication network using real traffic generated by a non-simulated UE, in accordance with techniques described herein.

Turning now to FIG. 4, an example method 400 is illustrated in which a network simulator (such as the network simulator 110 of FIGS. 1-3) validates a simulated component of a communication network using real traffic (e.g., traffic generated by a non-simulated UE, such as the UE 105 of FIGS. 1-3). Accordingly, the method 400 may be performed by one or more processors of the simulator. In the scenario reflected by the method 400, the simulator is simulating a base station to, for example, test a software update to the deployed base station software. For example, the software update may support new features and/or change the functionality of existing features. It should be appreciated that the techniques described with respect to the method 400 may be adapted to test software associated with other components of the communication network by instantiating a corresponding module in the simulation environment.

The method 400 begins at block 402 when the one or more processors instantiates a simulation environment that includes a base station module (such as the base station module 118 of FIGS. 1-3), a UE module (such as the UE module 112 of FIGS. 1-3), and a simulated communication link (such as the simulated communication link 115 of FIGS. 1-3) therebetween. For example, the UE module may be configured to simulate various types of user equipment, such as mobile phones, tablets, smart devices, IOT devices, etc. Similarly, the base station module may be instantiated to execute the software update under test. As described herein, in some embodiments the simulator may include hardware emulation capabilities. Accordingly, in those embodiments, the UE module and the base station module may be instantiated using different processors of the one or more processors.

At block 404, the one or more processors receive, via a proxy, reverse link traffic from a non-simulated UE (such as the UE 105 of FIGS. 1-3). As described herein, the simulation environment may be associated with a proxy configured to route traffic received from a network address associated with the non-simulated UE to a network address associated with the simulator and/or the instantiated UE module. In some embodiments, the proxy is disposed at a deployed component of the communication network, such as the base station 125 of FIG. 1. In other embodiments, the proxy is located at the simulator. In the latter embodiments, the non-simulated UE may be configured to execute an application that redirects the reverse link traffic from a deployed network component to the proxy.

At block 406, the one or more processors, route the reverse link traffic over the simulated communication link. As described herein, the simulated communication link may be configured to utilize a different protocol than the communication link between the non-simulated UE and the proxy. For example, the simulated communication link may be a New Radio (NR) communication link; whereas the communication link between the non-simulated UE and the proxy may be a long term evolution (LTE) communication link or Wi-Fi communication link. In some embodiments, the UE module may be configured to hold and/or delay some packets included in the reverse link traffic prior to routing the packets over the simulated communication link.

At block 408, the one or more processors on which the base station module is instantiated processes the reverse link traffic. For example, the reverse link traffic may include requests to establish a communication session and/or data to be exchanged within an existing communication session. Accordingly, the base station module may utilize the software under test to process the reverse link traffic. As part of the processing, the base station module may transmit the reverse link traffic to the deployed components of the communication network (such as the backhaul 120 of FIGS. 1-3). For example, the base station module may transmit the user-plane communications to a user plane function (UPF) of the deployed components of the communication network and the control-plane communications to the session management function (SMF) of the deployed components of the communication network.

At block 410, the one or more processors instantiating the base station module receive, form the deployed components of the communication network forward link traffic. For example, the forward link traffic may be generated in response to the reverse link traffic.

At bock 412, the one or more processors instantiating the base station module receive process the forward link traffic. For example, the forward link traffic may include information relating to the establishment of a communication session and/or data exchanged as part of an established communication session. Similar to processing the reverse link traffic, the base station module may utilize the software under test to process the forward link traffic. As part of processing the forward link traffic, the base station module may transmit the forward link traffic over the simulated communication link to the UE module.

At block 414, the one or more processors that instantiate the UE module transmits the forward link traffic to the non-simulated UE. In some embodiments, the UE module transmits the forward link traffic to the proxy which, in turn, routes the forward link traffic to the non-simulated UE.

As described herein, the simulator may be configured to monitor the instantiated simulation environment to detect any errors associates with processing the forward and/or reverse link traffic. For example, the simulator may be configured to detect any processing failures associated with the instantiated base station. The processing failures may be error messages included in the forward and/or reverse link traffic that are defined by a communication protocol used in the simulation environment. As another example, the simulator may be configured to monitor characteristics of the forward and/or reverse link traffic (e.g., throughput, packet loss, round trip time, etc.). Accordingly, the simulator may detect that the characteristic does not meet a benchmark value for the characteristic. In either example, the one or more processors may generate an alert indicating the detected condition. The one or more processors may be configured to display the alert on a UI of the simulator and/or transmit the alert to the non-simulated UE or a configuration device (such as the configuration device 130 of FIGS. 1-3).

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based upon the application of 35 U.S.C. § 112(f).

Throughout this specification, plural instances may implement components, operations, or structures described as a single instance. For example, in 5G networks, various components (including the proxies and/or SEPPs described herein) may be virtual components distributed across a plurality of servers interconnected to one another and implemented, for example, using a network functions virtualization (NFV) framework. Accordingly, any reference to a 5G network component envisions the logical arrangement of the 5G network component acting as a single function block that is implemented by a plurality of computing devices distributed across a plurality of physical locations of the corresponding network.

Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

This detailed description is to be construed as exemplary only and does not describe every possible embodiment, as describing every possible embodiment would be impractical, if not impossible. One could implement numerous alternate embodiments, using either current technology or technology developed after the filing date of this application. Upon reading this disclosure, those of skill in the art will appreciate still additional alternative structural and functional designs for system and a method for assigning mobile device data to a vehicle through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A network simulator comprising:
a base station simulation module configured to (i) simulate performance of a base station of a communication network, (ii) receive forward link traffic from deployed components of the communication network, and (iii) transmit reverse link traffic to the deployed components of the communication network; and
a user equipment (UE) module configured to exchange data with the base station simulation module via a simulated communication link, the UE module being associated with a proxy configured to correspond a network address of a non-simulated UE with a network address associated with the UE module, wherein the non-simulated UE is engaged in one or more communication sessions associated with one or more background applications operating on the non-simulated UE,
wherein the proxy is configured to correspond the network address of the non-simulated UE with the network address associated with the UE module via performing a network address translation (NAT) of at least one of the network address of the non-simulated UE or the network address of the non-simulated UE,
wherein the UE module is configured to receive the reverse link traffic from the non-simulated UE via the proxy and identify a type of packet included in the reverse link traffic, the UE module being configured to route the received reverse link traffic over the simulated communication link or hold the reverse link traffic until a scheduling condition is met based at least in part on the type of packet, and
wherein the UE module is configured to receive the forward link traffic from the base station simulation module and route the received forward link traffic to the non-simulated UE,
wherein the deployed components of the communication network and the non-simulated UE are external to the base station simulation module and the UE module, and are separate and distinct from each other.

2. The network simulator of claim 1, wherein:
the deployed components of the communication network include a user plane function (UPF); and
the base station simulation module is configured to transmit user plane communications within the reverse link traffic to the UPF.

3. The network simulator of claim 1, wherein:
the deployed components of the communication network include a session management function (SMF); and
the base station simulation module is configured to transmit control plane communications within the reverse link traffic to the SMF.

4. The network simulator of claim 1, wherein the simulated communication link is a simulated New Radio (NR) communication link.

5. The network simulator of claim 4, wherein the simulated communication link between the proxy and the non-simulated UE is a long term evolution (LTE) communication link.

6. The network simulator of claim 4, wherein the communication link between the proxy and the non-simulated UE is a Wi-Fi communication link.

7. The network simulator of claim 1, wherein the UE is an internet-of-things (IoT) device.

8. The network simulator of claim 1, wherein the non-simulated UE is configured to execute an application that redirects reverse link traffic from a deployed network component to the proxy.

9. The network simulator of claim 1, wherein the network simulator includes the proxy.

10. The network simulator of claim 1, wherein the proxy is located at a deployed base station in the communication network.

11. A method for validating a simulated component of a communication network using real traffic, the method comprising:

instantiating, by one or more processors, a simulation environment that includes (i) a base station module configured to simulate performance of a base station of a communication network, (ii) a user equipment (UE) module configured to simulate performance of a non-simulated UE, and (iii) a simulated communication link between the base station module and the UE module, wherein the non-simulated UE is engaged in one or more communication sessions associated with one or more background applications operating on the non-simulated UE;

generating a proxy to correspond a network address of the non-simulated UE with a network address associated with the UE module via performing a network address translation (NAT) of at least one of the network address of the non-simulated UE or the network address of the non-simulated UE;

receiving, via the proxy, reverse link traffic from the non-simulated UE;

identifying, by the one or more processors, a type of packet included in the reverse link traffic;

holding, by the one or more processors, the reverse link traffic based at least in part on the type of packet;

determining, by the one or more processors, that a scheduling condition is met based at least in part on the type of packet;

routing, by the one or more processors and based at least in part on the scheduling condition being met, the reverse link traffic over the simulated communication link;

processing, by the one or more processors and via the base station module, the reverse link traffic, wherein processing the reverse link traffic includes determining that the reverse link traffic is not from a data stream associated with the one or more background applications and transmitting the reverse link traffic to deployed components of the communication network;

receiving, from the deployed components of the communication network, forward link traffic;

processing, by the one or more processors and via the base station module, the forward link traffic, wherein processing the forward link traffic includes transmitting the forward link traffic over the simulated communication link; and transmitting, via the UE module, the forward link traffic to the non-simulated UE, wherein the deployed components of the communication network and the non-simulated UE are external to the base station module and the UE module, and are separate and distinct from each other.

12. The method of claim 11, wherein:

the deployed components of the communication network include a user plane function (UPF); and transmitting the reverse link traffic to the deployed components comprises transmitting, via the base station module, user plane communications within the reverse link traffic to the UPF.

13. The method of claim 11, wherein:

the deployed components of the communication network include a session management function (SMF); and transmitting the reverse link traffic to the deployed components comprises transmitting, via the base station module, control plane communications within the reverse link traffic to the SMF.

14. The method of claim 11, wherein the communication link between the proxy and the non-simulated UE is a long term evolution (LTE) communication link.

15. The method of claim 11, wherein the communication link between the proxy and the non-simulated UE is a Wi-Fi communication link.

16. The method of claim 11, wherein the non-simulated UE is configured to execute an application that redirects reverse link traffic from a deployed network component to the proxy.

17. The method of claim 11, wherein the proxy is located at a deployed base station in the communication network.

18. The method of claim 11, further comprising:

detecting, via the one or more processors, a processing failure associated with the base station module; and generating, via the one or more processors, an alert indicating the processing failure.

19. The method of claim 11, further comprising:

detecting, via the one or more processors, a characteristic of the forward link traffic or the reverse link traffic does not meet a benchmark value; and generating, via the one or more processors, an alert indicating the characteristic does not meet the benchmark value.

20. A non-transitory computer storage medium for validating a simulated component of a communication network using real traffic, the non-transitory computer storage medium having programming instructions stored thereon that, when executed by one or more processors, perform operations comprising:

instantiating a simulation environment that includes (i) a base station module configured to simulate performance of a base station of a communication network, (ii) a user equipment (UE) module configured to simulate performance of a non-simulated UE, and (iii) a simulated communication link between the base station module and the UE module, wherein the non-simulated UE is engaged in one or more communication sessions associated with one or more background applications operating on the non-simulated UE;

generating a proxy to correspond a network address of the non-simulated UE with a network address associated with the UE module via performing a network address translation (NAT) of at least one of the network address of the non-simulated UE or the network address of the non-simulated UE;

receiving, via the proxy, reverse link traffic from the non-simulated UE;

identifying a type of packet included in the reverse link traffic;

holding the reverse link traffic based at least in part on the type of packet;

determining that a scheduling condition is met based at least in part on the type of packet;

routing, based at least in part on the scheduling condition being met, the reverse link traffic over the simulated communication link;

processing, via the base station module, the reverse link traffic, wherein processing the reverse link traffic includes determining that the reverse link traffic is not from a data stream associated with the one or more background applications and transmitting the reverse link traffic to deployed components of the communication network;

receiving, from the deployed components of the communication network, forward link traffic;

processing, via the base station module, the forward link traffic, wherein processing the forward link traffic includes transmitting the forward link traffic over the simulated communication link; and transmitting, via the UE module, the forward link traffic to the non-simulated UE, wherein the deployed components of the communication network and the non-simulated UE are external to the base station module and the UE module, and are separate and distinct from each other.

* * * * *